UNITED STATES PATENT OFFICE.

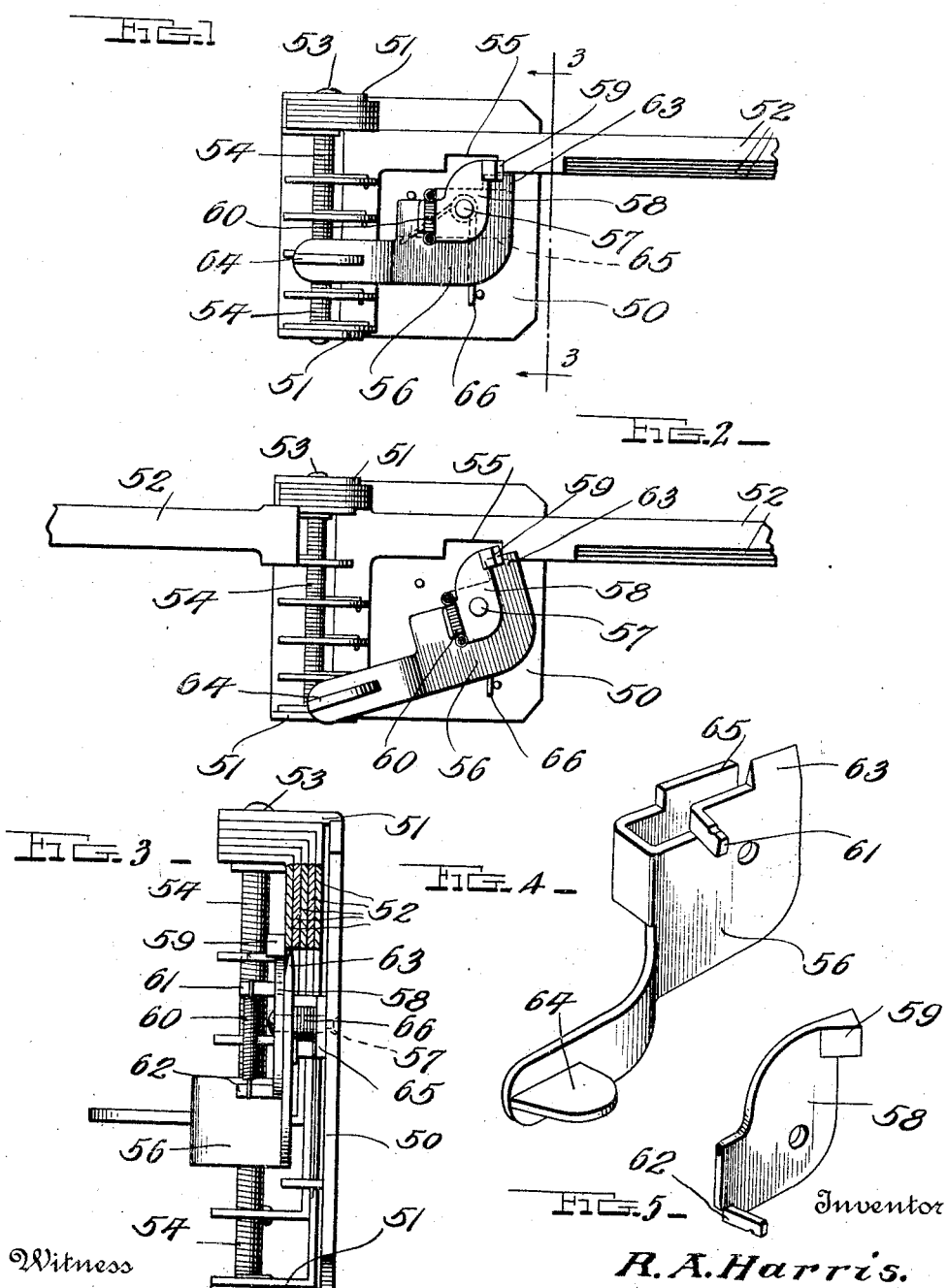

RUFUS A. HARRIS, OF SALEM, OREGON.

MUSIC-TURNER.

1,239,006.  Specification of Letters Patent.  Patented Sept. 4, 1917.

Application filed July 27, 1916. Serial No. 111,702.

*To all whom it may concern:*

Be it known that I, RUFUS A. HARRIS, a citizen of the United States, residing at Salem, in the county of Marion and State of Oregon, have invented certain new and useful Improvements in Music-Turners; and I do declare the following to be a full, clear, and exact description of the invention, such as will enable others skilled in the art to which it appertains to make and use the same.

My invention is an improved device for turning music whether the leaves thereof be bound or loose and the object of the invention is to provide a device of this class which may be inexpensively manufactured and marketed, yet one which regardless of these advantages, will be highly efficient and durable.

With this general object in view, the invention resides in certain novel features of construction and in unique combinations of parts to be hereinafter fully described, the descriptive matter being supplemented by the accompanying drawings which constitute a part of this application and in which:

Figure 1 is a front elevation showing the arm operating means, all parts being in their normal positions;

Fig. 2 is a similar view with the release lever depressed;

Fig. 3 is a transverse section on the plane of the line 3—3 of Fig. 1;

Fig. 4 is a perspective view of the release lever; and

Fig. 5 is a similar view of the dog.

In specifically describing the construction shown in the drawings above briefly described, similar characters will be employed to designate corresponding parts throughout the several views, and reference will be herein made to the numerous elements by their respective indices. To this end, the numeral 50 designates a plate to be secured to a support 1, said plate having ears 51. The inner ends of music turning arms 52 are mounted on a pin 53 extending between the ears 51 and each arm is provided with a spring 54 for impelling it to the left when released. All of the arms 52 are formed in their lower edges with rectangular notches 55.

A release lever 56 is fulcrumed to the plate 50 by means of a rivet or the like 57, and a swinging dog 58 is pivotally mounted on said rivet in front of the lever 56. One end of the dog 58 is extended as shown at 59 to engage the front faces of the arms 52 adjacent the right hand end of the notches 55 thereof in order that said arms may be normally held against movement, but may be released when the lever 56 is depressed to the position shown in Fig. 2. The end 59, is beveled in order that said dog may yield to permit the arms 52 to be swung to the right to their normal positions after being shifted to the left by their springs 54, said dog being yieldably held in operative position by means of a coil spring 60 whose ends are hooked over fingers 61 and 62 projecting respectively from the lever and the dog. One end of the lever 56 is provided with an integral stop nose 63, said nose being adapted to check the movement of the remaining arms when any one of said arms has been released by rocking of the lever 56.

The lever 56 is preferably stamped from a single sheet of metal as shown clearly in Fig. 4, a finger piece 64 being secured on one end of said lever for the purpose of depressing the same, said finger piece being disposed immediately in advance of the pivot 53 of the arm 52 in order that it may be easily reached by either hand of the musician. The finger 61 is formed by striking a part of the lever 56 forwardly and to effectively brace said lever upon its fulcrum 57, a part thereof is preferably bent rearwardly as shown at 65 and is mounted on said fulcrum. A coil spring 66 surrounds the fulcrum 57 as shown in dotted lines in Fig. 1 and serves to normally hold the lever 56 in the position shown in this figure and acts also to return said lever to this location after the same is actuated to release one of the arms 52.

In operation, assuming that all of the music turning arms 52 stand as shown in Fig. 1 of the drawings and that they are suitably connected with the sheets of music to be turned, the finger piece 64 will be depressed to rock lever 56 to the position shown in Fig. 2. This permits the nose 59 to release the arm which it has been previously holding and at the same time the stop nose 63 comes into play to prevent movement of the next arm. When the finger piece is now released, the spring 66 returns the lever 56 to its normal position in which it remains until again operated. When the arms 52 are to be returned to their initial positions, they are moved in this manner by hand and forced against the bevel of nose 59, the result being that the dog 58 will yield against the tension of its spring 60 to permit said arms to be moved behind said nose as shown in Fig. 1.

From the foregoing, taken in connection with the accompanying drawings, the construction and manner of operation of the invention will be readily understood without further explanation but in conclusion I will state that although certain specific details have been shown and described for illustrative purposes, numerous changes may be made within the scope of the invention as claimed without sacrificing the main advantages thereof.

I claim:

1. A music leaf turner comprising a plurality of horizontally moving leaf turning arms and means for swinging them from one position to another, said arms having vertically extending shoulders at their lower edges, a lever in the form of a plate disposed in a vertical plane beneath the normal position of and parallel with said arms, said lever being mounted pivotally between its ends, a handle extending from one end of said lever, a stop nose rising from and formed integrally with the upper edge of said lever at the other end thereof, a spring for yieldably holding said lever in position to dispose said nose below the path of the arms, a dog in the form of a pivotally mounted plate adjacent one side of said lever, said dog having a beveled nose extending above the aforesaid nose and coöperating with the shoulders of the leaf turning arms, and a spring for holding the dog in normal position and permitting it to yield downwardly when said arms are forced against it by hand in returning them to their initial positions.

2. A music leaf turner comprising a plurality of horizontally moving leaf turning arms and means for swinging them from one position to another, a support in rear of said arms, a pivot pin extending outwardly from said support beneath said arms, a lever in the form of a plate slit horizontally from one end toward the other and having its upper portion above said slit bent rearwardly into spaced relation with its body portion, said rearwardly bent portion and said body portion having openings receiving the aforesaid pin whereby the lever is fulcrumed, the portion of said lever below the aforesaid slit forming a handle for the lever, a sharpened nose formed integrally with and rising from the upper edge of the aforesaid lever, a spring for holding said lever in position to normally dispose said nose below the path of the music turning arms, a stop finger extending outwardly from said upper edge of the lever in spaced relation to the nose thereof, a dog pivotally mounted on the aforesaid pivot pin adjacent the front side of the lever and having a beveled nose coöperating with the aforesaid arms, said lever also having a portion abutting the under side of the aforesaid stop finger, and a coiled spring connecting said dog and said stop finger.

In testimony whereof I have hereunto set my hand in the presence of two subscribing witnesses.

RUFUS A. HARRIS.

Witnesses:
ASAHEL BUSH,
H. J. WENDEROTH.